United States Patent

Gustafson

[11] Patent Number: 6,050,622
[45] Date of Patent: Apr. 18, 2000

[54] SAFETY SEALING DEVICE

[76] Inventor: Ake Gustafson, Rte. Champ Thomas, 1618, Chatel-St-Denis, Switzerland

[21] Appl. No.: 08/774,319

[22] Filed: Dec. 24, 1996

Related U.S. Application Data

[63] Continuation-in-part of application No. 08/244,751, filed as application No. PCT/EP92/02841, Dec. 7, 1992, abandoned.

[30] Foreign Application Priority Data

Dec. 19, 1991 [CH] Switzerland ............... 3785/91

[51] Int. Cl.$^7$ .............. G08B 13/14; B65D 27/30
[52] U.S. Cl. ............. 292/307 R; 340/572; 340/568; 70/57.1
[58] Field of Search ............ 292/307 A, 307 R, 292/325, DIG. 65, 331; 70/57.1, 440; 24/30.5 R, 30.5 P, DIG. 11; 340/568, 571, 572

[56] References Cited

U.S. PATENT DOCUMENTS

| | | | |
|---|---|---|---|
| 2,013,299 | 9/1935 | Byrne | 292/307 A |
| 2,292,272 | 8/1942 | Hirshfield | 24/DIG. 11 |
| 3,463,532 | 8/1969 | Chidley et al. . | |
| 3,914,829 | 10/1975 | Paskert . | |
| 3,932,918 | 1/1976 | Paskert . | |
| 4,000,488 | 12/1976 | Ephraim | 340/572 |
| 4,339,853 | 7/1982 | Lipschitz . | |
| 4,425,999 | 1/1984 | MacDonald et al. . | |
| 4,498,076 | 2/1985 | Lichtblau . | |
| 4,600,923 | 7/1986 | Hicks et al. . | |
| 4,694,283 | 9/1987 | Reeb | 340/572 |
| 4,728,938 | 3/1988 | Kaltner . | |
| 4,746,830 | 5/1988 | Holland | 310/313 D |
| 4,751,500 | 6/1988 | Minasy et al. . | |
| 4,761,656 | 8/1988 | Cosman et al. . | |
| 4,835,524 | 5/1989 | Lamond et al. . | |
| 4,987,754 | 1/1991 | Minasy et al. . | |
| 5,057,844 | 10/1991 | Rothstein . | |
| 5,081,446 | 1/1992 | Gill et al. . | |
| 5,103,210 | 4/1992 | Rode et al. | 340/572 |
| 5,106,175 | 4/1992 | Davis et al. . | |
| 5,120,097 | 6/1992 | Fattori et al. | 393/307 A |
| 5,181,021 | 1/1993 | Lee et al. | 340/572 |
| 5,241,299 | 8/1993 | Appalucci et al. | 340/572 |
| 5,282,914 | 2/1994 | Spendlove | 24/DIG. 11 |
| 5,440,293 | 8/1995 | Tice . | |
| 5,528,222 | 6/1996 | MFoskowitz et al. | 340/572 |
| 5,574,431 | 11/1996 | McKeown et al. | 340/572 |
| 5,574,470 | 11/1996 | De Vall | 340/572 |
| 5,608,379 | 3/1997 | Narlow et al. . | |

FOREIGN PATENT DOCUMENTS

| | | | |
|---|---|---|---|
| 177 394 | 4/1986 | European Pat. Off. . | |
| 283 084 | 9/1988 | European Pat. Off. . | |
| 292827 | 11/1988 | European Pat. Off. | 292/307 R |
| 377 257 | 7/1990 | European Pat. Off. . | |
| 2385872 | 12/1978 | France | 109/42 |
| 2 658 166 | 8/1991 | France . | |
| 4310809 | 10/1994 | Germany | 292/307 R |
| 94/14143 | 6/1994 | WIPO | 292/307 R |

Primary Examiner—Darnell M. Boucher
Attorney, Agent, or Firm—Oliff & Berridge, PLC

[57] ABSTRACT

A safety sealing device includes a support. An electronic safety circuit is glued to one face of the support. The electronic safety circuit includes a winding of fine wire connected to an electronic component. The electronic component is activated and interrogated by outside checking means via the winding, which acts as an antenna. The electronic component may be coded so that it responds to the interrogation with its code. The safety sealing device may further comprise differentiated gluing means. When attempting to tamper with the support to which the safety circuit has been glued in order to unseal a receiving article, the attempt at ungluing or a tearing causes a break in the continuity of the electronic circuit. As a result, the electronic component no longer responds to an interrogation with its code, thus assuredly indicating that the safety sealing device has been tampered with.

71 Claims, 9 Drawing Sheets

SAFETY SEALING DEVICE

This application is a continuation in part of U.S. Ser. No. 08/244,751, filed Jun. 9, 1991, now abandoned, which claims priority to International Application PCT/GP92/02341, filed Dec. 7, 1992.

BACKGROUND OF THE INVENTION

1. Field of the Invention

The present invention concerns a safety sealing device capable of being used for numerous applications, the integrity of this sealing device being checkable by preferably automatic, fixed or portable electronic means.

2. Description of the Related Art

On numerous occasions it is necessary to be able to ensure that the contents of some recipient have not been fraudulently modified during a storage period or during transportation, for example, or since the moment when the sealing was affixed to the recipient, respectively.

The term recipient used here is of very general range, it may be a building of which the door and the windows have been sealed, just as well as a measuring apparatus of which the adjustment rust be preserved or a box whose contents must not be altered, etc. Likewise by sealing, it is not absolutely necessary that the recipient in question cannot be opened, it may also be an operation of marking an object, for example a suitcase at the time of a trip, said marking having to remain attached to the object without a possibility of being taken off it, exchanged or altered before the end of said trip, or before the accomplishment of a checking operation, respectively.

To ensure this, there is generally a seal on the recipient or the object in question, this seal generally being made up of a piece or a strip of paper, cardboard, cloth, plastic, or thin metal, a portion of which is fixed to a first part of the recipient, while another portion is fixed to a second part of the recipient, the opening of the recipient, or the separation of the two parts or the opening of the seal, respectively, being able to take place only by tearing the sealing strip; the sealing piece or strip generally has a shape and size adapted to the type of recipient to be sealed. A sealing device of this type, provided for the sealing of a bottle, is described for example in FR-A-2,658,166.

Another prior art device is made up of a wire forming a loop in order to prevent the opening of a recipient, or to be able to be taken off the object to which it is fixed, respectively, two strands of wire closing the loop being joined by a wax or lead seal.

Such sealing devices according to the prior art include the main drawback of being able to be relatively easily broken. It is generally possible to defraud them by taking the necessary time and/or precautions to carefully detach or unstick one of the portions of the device and to replace it after having emptied or exchanged the contents of the recipient. In the case of a simple marking, it is possible, in the same way, to modify or exchange said marking. Moreover, a check of the integrity of the sealing can take place only piece by piece, by a visual examination of each sealing, which is long and expensive.

A sealing device capable of being checked electronically is described in U.S. Pat. No. 4,751,500. This device is specially adapted in order to check the circulation of merchandise in sales premises in order to avoid the theft thereof. It is designed to be used in premises of which the entrances are equipped with electronic checking means. A sealing device is disposed on each unit of product to be sold, the unsealing of the product being able to be done only by means of a special tool which does not destroy the sealing device. The device described here can be used only on specific premises.

Another electronic-check sealing device is described in EP-A-0 177 394. In this case, the seal is composed of an ultrasound cavity connected to a receiver transducer and to another transmitter transducer. These transducers are electrically connected to a probe ensuring the connections to the checking circuits. The unsealing of the seal causes a deformation or destruction of the ultrasound cavity, thus modifying its response to a given excitation. The drawback of this device is that it is necessary to electrically connect each seal to the checking device in order to energize the seal and check the response thereof.

EP-A-0 377 257 describes a device for the identification of objects, each of them bearing a seal provided with a code. The code can be remotely read electromagnetically, but for this the seal needs to be fed by its own voltage source. It is not anticipated that the code may be modified by destruction of the seal.

SUMMARY OF THE INVENTION

A first object of the invention is to propose a sealing and/or marking device not including the main drawback of those of the prior art, i.e., a sealing device of which the integrity can be remotely checked by preferably automatic, fixed or portable electronic means.

Another object of the invention is to propose a device of which an attempt at fraud can be detected with certainty.

Another object of the invention is to propose a sealing device capable of being used during a very long period without its characteristics being modified.

In order to achieve these different objects, the subject of the invention is a safety sealing device in accordance with the claims.

BRIEF DESCRIPTION OF THE DRAWINGS

The appended drawing comprising several figures, with the aid of the description which follows, permits the invention and its applications to be better understood.

DETAILED DESCRIPTION OF THE PREFERRED EMBODIMENTS

Figure 1:
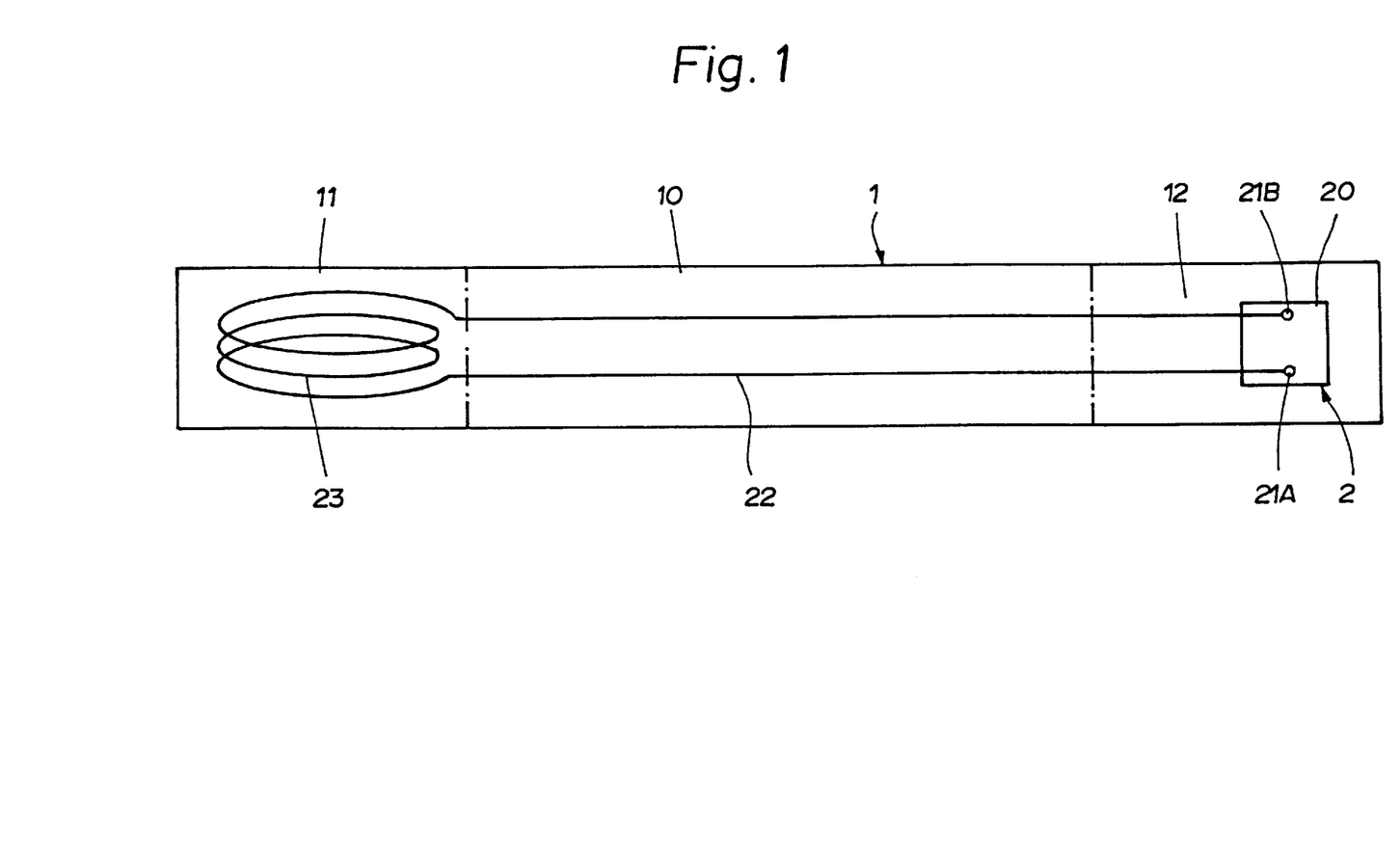
FIG. 1 shows an embodiment of a sealing device according to the invention before installation.

In FIG. 1 there is a sealing strip 1 acting as a support, made up of a sheet of paper, cardboard, cloth, or plastic and including three zones, two gluing zones 11 and 12 and one intermediate zone 10, also capable in certain cases of being a gluing zone, the functions of which will be explained below. Fixed by gluing on one face of this sealing strip 1 is a safety circuit 2 composed of a transmitter capsule 20 preferably made up of a codable electronic component or comprising such a component, and comprising in particular two soldering paths 21A and 21B connected by the connection wires 22 to a flat coil 23 including a plurality of turns of an insulated conductor wire. The whole of the safety circuit 2 is disposed on one face of the sealing strip 1, the coil 23 being glued preferably on the corresponding face of the gluing zone 11, while the transmitter capsule 20 is glued on the other gluing zone 12, the intermediate zone 10 comprising the connection wires 22 which are also glued there.

The electronic safety circuit 2 is passive, that is it does not comprise any source of energy, which means that its operation and its characteristics are not dependent upon the discharge of a battery; the characteristics of the circuit 2 will therefore be constant in the course of time, permitting use of very long duration.

As has been said previously, the electronic component disposed on the transmitter capsule 20 or constituting said transmitter capsule is codable, according to known technology, that is it is an integrated component, the elements of which are disposed in such a way that a code, for example numeric, can be programmed, and that when the component is interrogated by an auxiliary transceiver apparatus, it responds to this code and solely thereto. The operation of programming the code generally takes place at the factory, or else later by the user with the aid of the suitable equipment. After the code has been programmed, the code is preferably locked, that is one or more portions of the electronic component are destroyed, for example by a laser device, so that the code can no longer be modified later. At the time of the check of the integrity of the circuit 2, or of the integrity of the sealing, respectively, by a checking transceiver apparatus, the winding of fine wire 23 acts as an antenna by which the electronic component 20 is activated, interrogated, and by which it responds to its code. The check of the integrity of the sealing can therefore take place without the checking apparatus coming directly in contact with any part of the sealing device.

In order that the figures may be understandable, the elements composing the safety circuit 2 have been enlarged relative to the size of the sealing strip 1, just as the number of turns of the winding 23 has been greatly reduced; the transmitter capsule 20 comprising the two conductor paths 21A and 21B can typically have a size on the order of 1 mm on each side, whereas the diameter of the varnish-insulated wire constituting the coil 23 and the connection wires 22 can typically be on the order of 2 to 5 hundredths of a mm, and the coil can comprise a few hundred turns.

Figure 2:
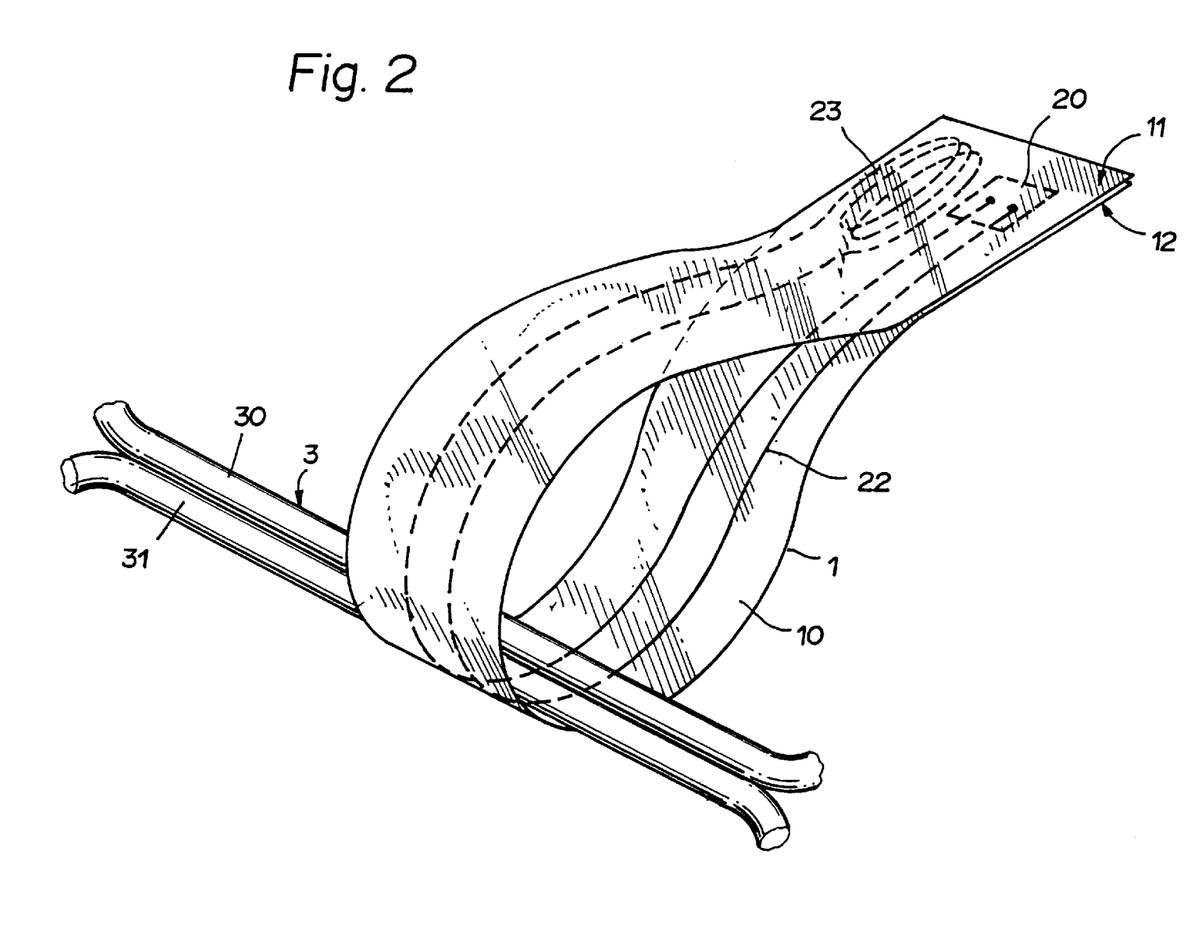
FIG. 2 shows the same device installed for protecting the opening of a recipient or for marking an object.

The use of the above sealing device is depicted in FIG. 2, where it is seen that the sealing strip 1 encircles two portions 30 and 31 of a closure device 3 of a recipient not depicted in the figure. The sealing strip 1 is responsible for ensuring that the two portions 30 and 31 have not been moved apart, or that the recipient has not been opened, respectively, since the moment when the sealing strip 1 was put in place. For this purpose, the sealing strip 1 encircles the two portions 30 and 31 in such a way as to form a loop closed by gluing of the gluing zone 11 onto the other gluing zone 12. Seeing that the intermediate zone 10 forming the loop encircling the two portions 30 and 31 is traversed by the connection wires 22, opening of the loop, or tearing of the sealing strip 1, respectively, definitely causes ripping of said connection wires 22, hence breaking the continuity of the safety circuit 2. Preferably, the device will include differentiated gluing means such that if, desiring to defraud the sealing, someone tries to unglue the two gluing zones 11 and 12 closing the loop, at least one of the elements constituting the safety circuit remains glued to a part of the support or more generally of a part of the object to which it is fixed, whereas at least one of the other elements constituting the safety circuit remains glued to another part of the support or more generally of another part of the object to which it is fixed. In the case depicted, the transmitter capsule 20 is, for example, glued to the gluing zone 12 with relatively weak adherence, whereas the zone 11 comprising the winding 23 and coming to be flattened against the zone 12 is provided with a glue having relatively high adherence, higher than that causing the transmitter capsule 20 to adhere to the zone 12, in such a way that the transmitter capsule 20 adheres more strongly to the zone 11 than to the zone 12 when the two zones are assembled. In this way, by moving the two zones 11 and 12 apart, even with great care, the transmitter capsule 20 as well as the( coil 23 remain glued to the zone 11, while the connection wires 22 remain glued to the intermediate zone 10 and inevitably break at the time of the separation of the zones 11 and 12; in this way, the continuity of the safety circuit 2 is also interrupted.

For better understanding of FIG. 2, the electronic component 20 and the coil 23 have been depicted beside one another, but it is just as possible for these two elements to be superimposed at the time of gluing of the zone 11 to the zone 12.

When the continuity of the safety circuit 2 is broken, the electronic component 20 can no longer be interrogated seeing that its connection to the coil 23 acting as an antenna is interrupted; it therefore no longer reacts when it is interrogated in the way described previously. In view of the extremely small size of the components of the safety circuit 2, it is virtually impossible to re-establish the continuity of the circuit, for example by trying to reconnect two torn wires in order to try to reconstitute the circuit. Thus, opening of the safety circuit permits sure detection of a sealing which is supposed to have been violated, when upon interrogating this sealing no coded signal is received back.

Figure 3A:
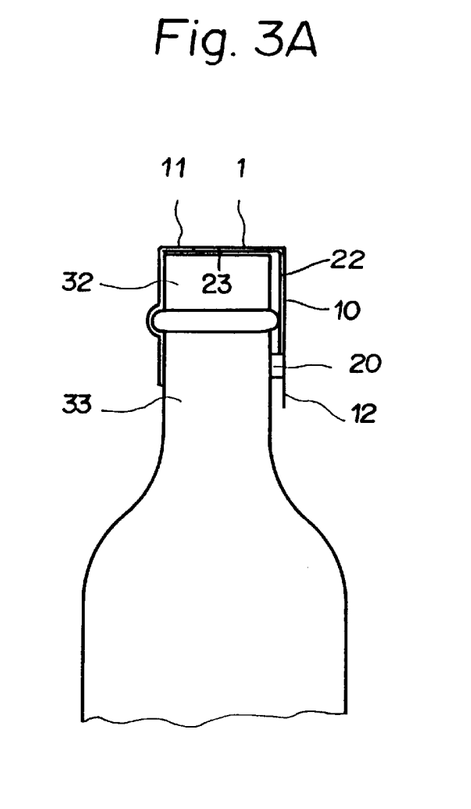
FIGS. 3A, 3B, and 3C show three perpendicular views of embodiment of a sealing device according to the invention, mounted on the neck of a bottle.
Figure 3B:
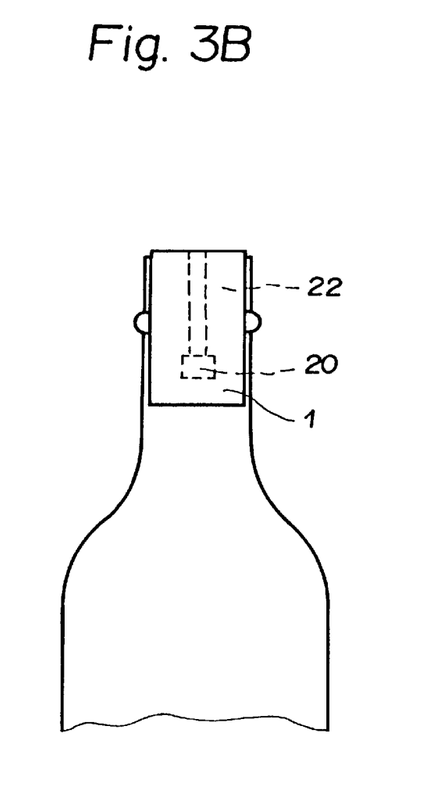
Figure 3C:
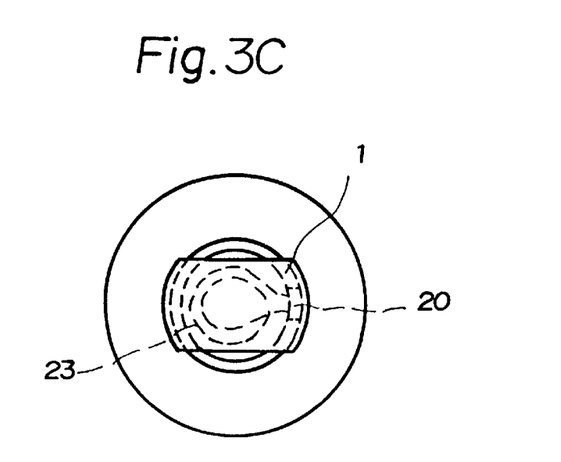

Another embodiment of the sealing device according to the invention is seen in FIGS. 3A, 3B, and 3C, where it is depicted as applied to the sealing of a bottle.

In this case, the sealing strip 1 must ensure that the stopper 32 has not been withdrawn from the neck 33 so that the quality of the product contained in the bottle may be guaranteed. The sealing strip 1 is similar to that described above, except that its shape and its size have been adapted to the use foreseen. In this case, it is only necessary for at least one of the components of the safety circuit to be strongly glued to the stopper 32 and to the neck 33, for example, the adhesive end 11 of the strip 1 comprising the coil 23 is strongly glued over the top face of the stopper 32, while the transmitter capsule 20 is strongly glued to the side face of the neck 33, or else it may be the central portion 10 comprising the connection wires 22 which is strongly glued both to the stopper 32 and to the neck 33. Thus, any attempt at tearing or ungluing of the sealing strip 1 brings about breaking of the continuity of the safety circuit 2, hence signalling that the quality of the liquid contained in the bottle can no longer be guaranteed.

Figure 5:
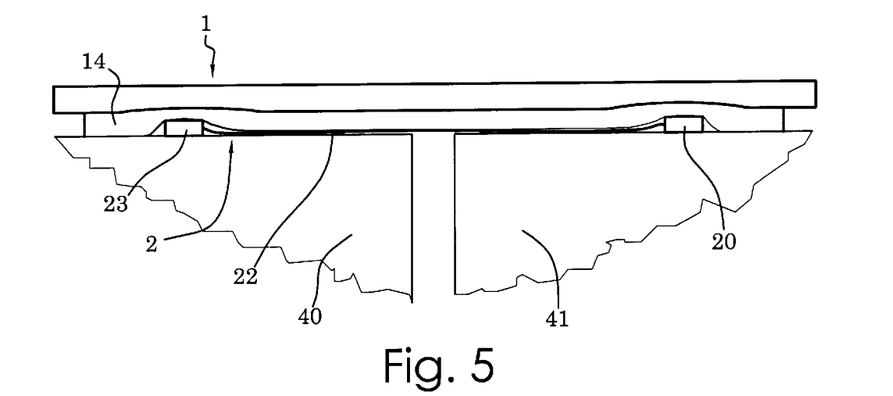
FIG. 5 shows the sealing device according to the invention used to seal two relatively movable objects.

FIG. 5 shows the sealing device 1 of this invention used to seal two relatively movable objects 40 and 41. The relatively movable objects 40 and 41 can be a door and a doorjamb, two French doors, the two halves of a suitcase or attache case, a personal computer frame and cover, a desk and a drawer of the desk, a cardboard or other type of box, or the like. The sealing device 1 adheres to the relatively movable objects 40 and 41 by the adhesive film 14 such that moving one of the objects 40 or 41 relative to the other object 41 or 40, such as opening a door, causes the safety circuit 2 to break. Similarly, tampering with the sealing device 1, such as attempting to remove the sealing device 1 from one of the objects 40 or 41, also causes the electronic circuit 2 to break. The adhesive film 14 can be a single continuous adhesive film or can be provided only at the two) separate gluing zones 11 and 12.

It is therefore seen that the sealing device may be adapted to all sorts of closure,, and that the shape and the size of the sealing strip 1 and, consequently, those of the coil 23 as well as its position on the sealing strip may be adapted to the needs. Likewise, the relative positions of the gluing zones 11 and 12, as well as of the intermediate zone, may be adapted to the needs, it is not obligatory for the intermediate zone 10 to be situated between the gluing zones 11 and 12.

Figure 4A:
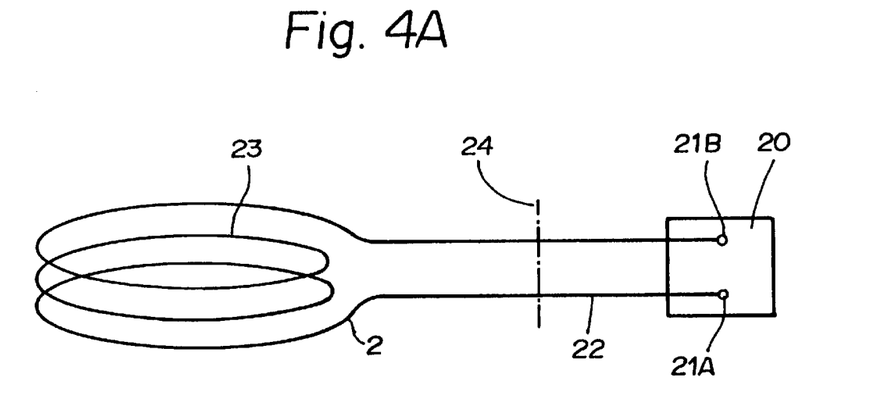
FIGS. 4A, 4B, and 4C show different embodiments of a safety circuit forming part of a sealing device according to the invention.
Figure 4B:
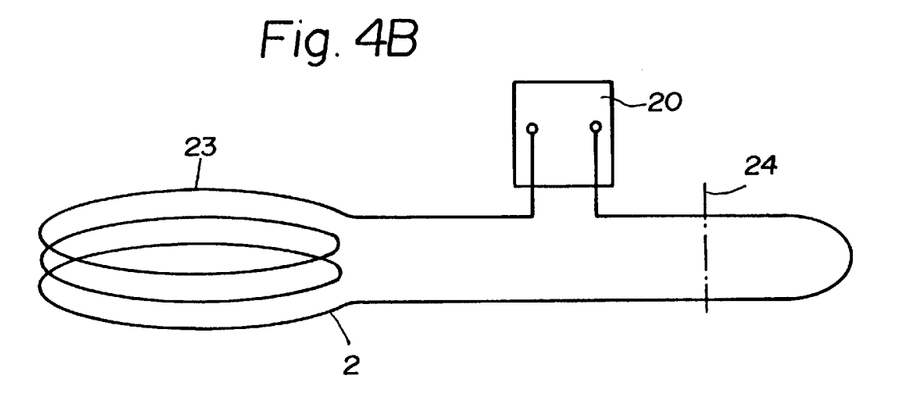
Figure 4C:
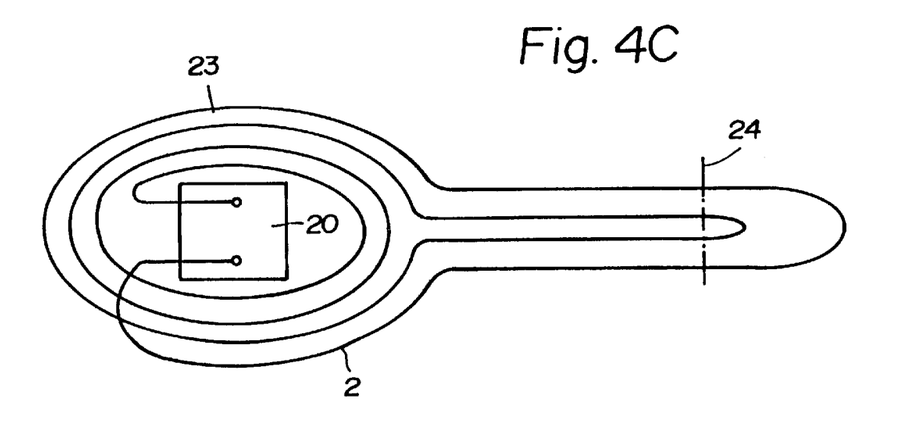

FIGS. 4A, 4B, and 4C show, among many others, three possible embodiments of the safety circuit 2, the lines 24 representing the locations foreseen for breaking of the sealing strip, or of the connection wires in case of tearing, respectively, it being possible to dispose beginnings of breaks on portions of the wire at these locations, preferably corresponding to the intermediate zone 10. Preferably, the coil 23 will be disposed on a portion of the sealing strip 1 remaining relatively flat when said strip is affixed to the object to be sealed, in order that its transmission characteristics may not be modified by deformation of said coil; the locations foreseen for the tearing of the sealing will be traversed by one or two of the connection wires in order that tearing may surely break the continuity of the safety circuit 2. It is also possible, in order to further reduce the risk of being able to re-establish the continuity of the safety circuit after unsealing, for one or more of the turns composing the coil 23 to be extended to pass through the locations foreseen for the breaking of the safety circuit, as depicted in FIG. 4C, thus increasing the number of wires to have to possibly reconnect.

In order to ensure securely a tearing of the connection wires 22 and a break in continuity of the safety circuit 2 in case of an attempt at fraud of the sealing, the device according to he invention comprises differentiated gluing means such that, if at the time of manufacture of the device, the component 20, the connection wires 22, and the coil 23 are each glued to a part (10, 11, 12) of the support 1, after the sealing has been put in place on the recipient to be protected, the adhesion of one or of two of the three elements constituting the safety circuit 2 adheres more strongly to the support part or of the recipient to which it has been applied than to the part of the support to which it was originally fixed. In other words, after sealing there is at least one element of the circuit which adheres strongly to the portion of the support to which it was originally fixed and at least one other element which adheres strongly to the part of support or of the recipient to which it was fixed at the time of the sealing. The choice of the elements provided with differentiated gluing means is made according to the desired use and the configuration of the sealing strip. Thus, however it may be sought to open the recipient or to remove all or part of the sealing strip, at least one element will remain attached to it, while at least one other element will remain attached to at least one part of the recipient to be protected.

The code introduced in the manner described above may correspond, for example, to the contents of the recipient, to a date of stocking, or to the destination of the product.

As has been said above, all that has been described here may also apply to a simple marking of some object, the sealing strip 1 simply being affixed to the object or formed into a loop in a loop or a suitable recess of the object; the coding then being able to serve to indicate the nature of the object or its destination, for example. In a manner similar to what has been described for the sealing of a recipient, the marking of an object by a device according to the invention permits ensuring that there has not been an exchange of objects; a checking system using marking de-ices according to the invention may be advantageously used, for example, to keep watch on the flow of baggage inside an airport. In a more general way, a recipient sealed by a device according to the invention may also be considered as being marked, in the sense indicated above.

Figure 6:
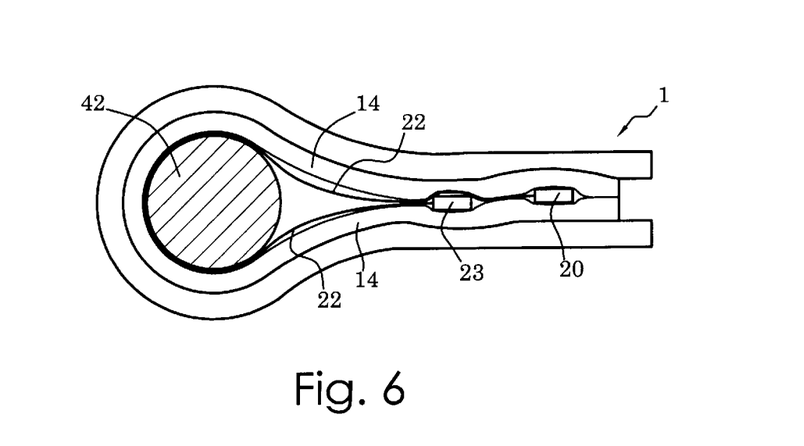
FIG. 6 shows the sealing device according to the invention provided around a single portion of a receiving article to tag or mark the recipient object.

FIG. 6 shows the sealing device 1 provided around a single portion of a receiving article 42 to be marked or tagged. As shown in FIG. 6, it is not necessary to provide the sealing device 1 around two or more relatively movable portion of the receiving article 42 in order to tag or mark the receiving article. Rather, the marking device 1 can be attached to itself, so long as enough of the marking device 1 adheres to itself such that any tampering with the marking device 1, such as an attempt to remove it from around the receiving article 42, causes the safety circuit 2 to break. Similarly, the marking device 1 can be attached to any portion of the receiving article 42, so long as enough of the marking device 1 adheres to the receiving article 42 that any tampering with the marking device 1, such as an attempt to remove it from the receiving article 42, causes the safety circuit 2 to break.

Figure 7:
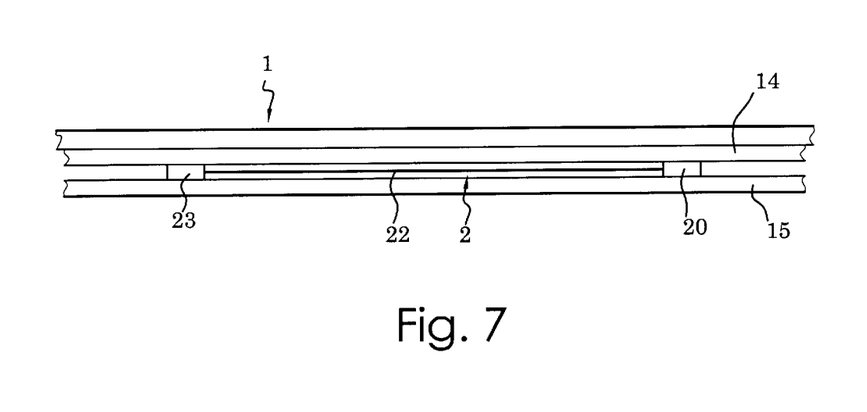
FIG. 7 shows a further embodiment of the sealing device of FIG. 1 having two adhesive layers.

FIG. 7 shows another embodiment of the sealing device 1 of this invention including two adhesive films 14 and 15 provided over the support. In particular, the first adhesive film 14 is provided on or over one surface of the support and the safety circuit 2 is provided on or over the first adhesive film 14. Then, the second adhesive film 15 is provided on or over the safety circuit 2 and the first adhesive film 14.

According to the use for which it is intended, the support of the sealing device will be of paper, of cardboard, or of plastic, the shape, the size of said support, as well as the arrangement of the transmitter capsule 20 and of the winding 23 being chosen in order to ensure the integrity of the sealing according to the way of opening the recipient in question. In the case where a portion of the electronic safety circuit might come in contact with a metal portion of the recipient or of the object, a protective insulating layer may easily be disposed on this portion or on the whole circuit.

Figure 8:
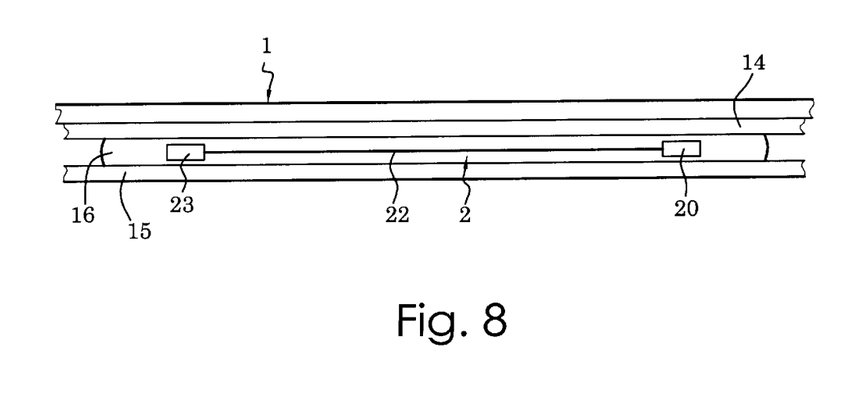
FIG. 8 shows another embodiment of the sealing device according to the invention having a protection film provided around the electronic circuit.

FIG. 8 shows the safety circuit 2 encased in a protective insulating layer or film 16. The protective film 16 can be plastic, varnish or the like. The protective film 16 and the safety circuit 2 are provided on or over the first adhesive film 14. As shown in FIG. 8, the second adhesive 15 is optionally provided on or over the protective film 16. However, the second adhesive film 15 is not required. It should also be appreciated that the mechanical strength of the protective film 16 cannot be so high that it prevents the safety circuit 2 from breaking should the sealing device 1 be tampered with or the two relatively movable portions of the receiving article 42 or the two relatively movable objects 40 and 41 be relatively moved.

The sealing device according to the invention, used as sealing or as marking, may therefore easily be checked by automatic means, for example by putting a transceiver device near said sealing device and checking that said circuit indeed responds to the code provided. Besides this function of checking the integrity of the sealing, a counting device may easily be added to the checking device in order to obtain a stock status by product, if each product responds to a certain code.

The safety sealing device according to the invention includes numerous advantages, it may therefore safely ensure that the sealing in question has not been violated, this by electronic means capable of being fixed or portable and preferably automatic, which greatly increases the rapidity and the reliability of the check and, consequently, reduces the costs thereof in proportion. Moreover, coding of the device is possible as need be. In view of the small size of the transmitter capsule and of the wire constituting the winding, the safety circuit is virtually invisible, a sealing device provided with such a circuit not being distinguishable from another sealing device not provided with a safety circuit. Besides the possibilities foreseen for checking the sealing, the same safety circuit may permit counting of the units in stock.

Figure 9:
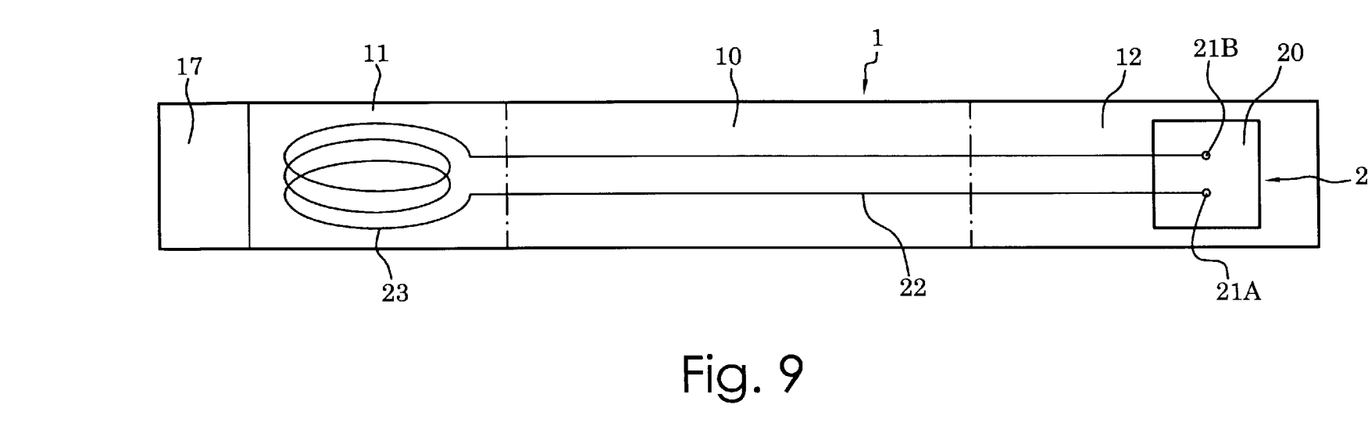
FIG. 9 shows a top plan view of the sealing device according to the invention having a detachable portion for purposely destroying the sealing device.

FIG. 9 shows a top plan view of the sealing device having a detaching portion. As shown in FIG. 9, the sealing strip 1 has a detaching portion 17 which is positioned outside of one of the two gluing zones 11 and 12. The safety circuit 2 formed by the transmitter capsule 20, the connection wires 22 and the flat coil 23 does not extend over the detaching portion 17.

The detaching portion 17 also acts as a gluing zone when the detaching function is not required. In that case, the entire sealing strip 1 is either attached to the receiving article 42 or attached to itself about one or more portions of the receiving article. For example, the sealing strip can be a luggage tag such as those used by the airlines, railroads and the like to identify and direct passenger luggage. The receiving article 42 is thus a piece of luggage. The sealing strip 1 is then placed around the handle or handles of the luggage, and one portion of the sealing strip 1 is attached to another portion of the sealing strip 1. Either portion may include the detaching portion 17 To remove the sealing strip 1, the two portions are merely separated, which simultaneously breaks the safety circuit 2.

Figure 10:
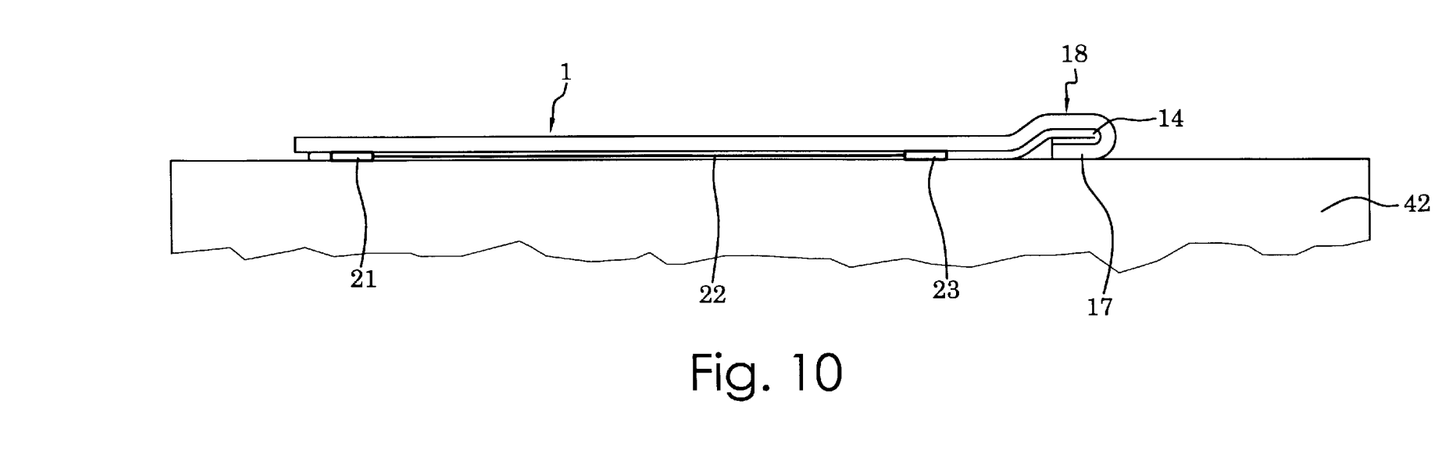
FIG. 10 shows a side view of the sealing device of FIG. 9 attached to a receiving article.

To use the detaching function provided by the detaching portion 17, the detaching portion 17 is folded under and attached to the gluing zone 11 to which it is adjacent. The sealing strip 1 with the detaching portion 17 attached to the gluing zone 11 is then attached to the receiving article 42 as shown in FIG. 10. Because the detaching portion 17 covers a portion of the adhesive layer 14, a portion 18 of the sealing strip 1 is not adhesively attached to the receiving article 42. Thus, in this case, the unattached portion 18 can be easily grasped by one wishing to intentionally remove or otherwise render the sealing strip inoperative.

For example, the receiving article 42 can be a trunk, box or the like which does not have a handle about the sealing strip can be placed. In this case, the sealing strip must be place directly onto a side of the trunk, box or the like. By folding the detaching portion 17 under the sealing strip 1 to form the unattached portion 18, the sealing strip 1 can be easily removed or the safety circuit 2 easily broken. Thus, once the usefulness of the luggage tag has ended, it can easily be removed by grasping the unattached portion 18 and pulling the sealing strip 1 off of the trunk, box or the like.

Figure 11:
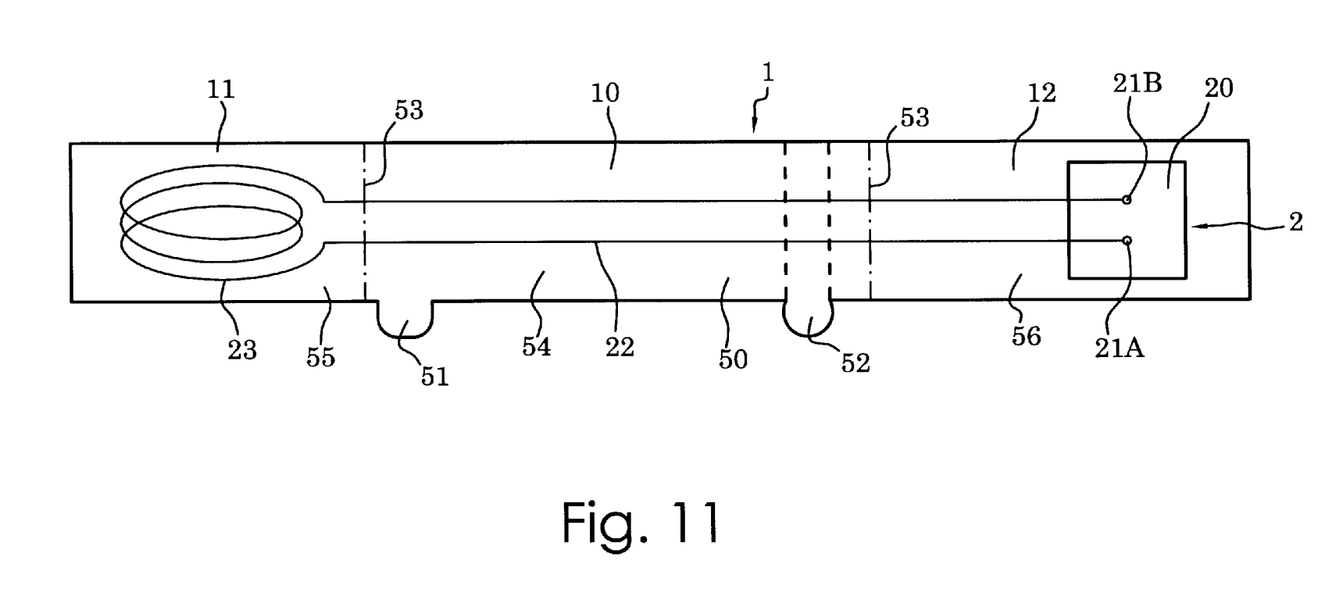
FIG. 11 shows a top plan view of a second embodiment of the sealing device of FIG. 9.

FIG. 11 shows a top plan view of a second preferred embodiment of the sealing device having a detachable portion. As shown in FIG. 11, the safety strip 1 includes a support 50 and the safety circuit 2 which is adhesively attached to the support 50 by the adhesive layer 14.

The support 50 comprises three portions 54, 55 and 56. The second and third portions 55 and 56 of the support 50 are adjacent to a first or detachable portion 54 and are distinguished from the detachable portion 54 by perforations 53. It should be appreciated that the perforations 53 can be replaced with any type of joining structure for joining the second and third portions 55 and 56 to the first portion 54, such as a weld formed or an adhesive layer provided between overlapping portions of the portions 54 and 55 or the portions 54 and 56. Only one of the perforations 53 is necessary if the detachable portion 54 is positioned in the center of the support member 50 as shown in FIG. 11. Furthermore, when one of the end portions 55 or 56 is used as the detachable portion, none of the perforations 53 need be provided.

As shown in FIG. 11, the detachable portion 54 is distinguished by the tab 51. The tab 51 is not adhesively attached to the receiving article, and thus can be easily grasped by a person who wishes to destroy the safety strip 1. The adhesive strength between the adhesive layer and the support 5) must be sufficiently high that at least one of the connection wires 22 preferentially adheres to the support 50 rather than the receiving article to which the safety strip 1 is attached.

A user who wishes to destroy the safety strip 1 grasps the tab 51 and firmly pulls; the detachable portion 54 away from the receiving article. Because at least one of the connection wires 22 strongly adheres to the detachable portion 54, pulling the tab 51 causes at least one of the connection wires 22 to detach from either the coil 23 and/or the circuit 20. This renders the safety strip 1 inoperative so that it will no longer respond to an interrogation signal. The tab 51 and the detachable portion 54 make it easy to remove the safety strip from the receiving article when the receiving article is intended to be opened or when the safety strip has fulfilled its purpose and is to be removed or rendered inoperative.

The tab 51 can be attached to either the end portion 55 or the end portion 56 of the support member 50, rather than the center detachable portion 54. In this case, the adhesive strength between the support 50, the adhesive layer and the receiving article should be such that a portion of the safety circuit 2 remains attached to the receiving article while another portion of the safety circuit 2 remains attached to the support 50, thus breaking the integrity of the safety circuit 2 and rendering the safety strip 1 inoperative when the tab 51 is pulled. In this case, the perforation 53 between the end portion 55 or 56 carrying the tab 51 and the rest of the support 50 is optional. The perforation 53 can be used to further ensure that removing the end portion 55 or 56 carrying the tab 51 breaks the safety circuit 2, by making the end portion 55 or 56 detachable from the rest of the support 50.

Finally, instead of the tab 51, a detaching layer 52 can be placed between the adhesive film and the receiving article. The detaching layer 52 need only extend across at least one of the wires 22, though it could extend across the full width of the support member 50 and could extend the full length of the middle portion 54. In this case, the perforation 53 between the end portion 56 and the center portion 54 of the support 50 is necessary to insure the safety circuit 2 is broken. When the tab portion of the detaching portion 52 is pulled away from the receiving article, the support 50 breaks at the perforation 53 adjacent to the detaching layer 52, thus breaking the integrity of the safety circuit 2.

The detaching layer 52 can also be placed adjacent to one of the perforations 53 under one of the end portions 55 or 56. In this case, the detaching layer 52 should not extend the full length of the end portion 55 or 56, so that that end portion remains attached to the receiving article and thus the safety strip 1 is not accidentally damaged. The detaching layer 52 can instead be placed near the end of one of the end portions 55 or 56. In this case, the perforations 53 are optional. If the perforations 53 are not used, the adhesive strength between the support 50, the safety circuit 2, the adhesive layer and the receiving article must be such that pulling the tab of the detaching layer 52 causes a portion of the safety circuit 2 to remain attached to the support 50, a second portion of the safety circuit 2 remaining attached to the receiving article.

It should be appreciated that the detaching portion 17, the tab 51 of the detachable portion 54, or the detaching layer 52 can be replaced by any structure which allows the safety strip 1 to be quickly and easily removed from the receiving article or rendered inoperative.

Figure 12:
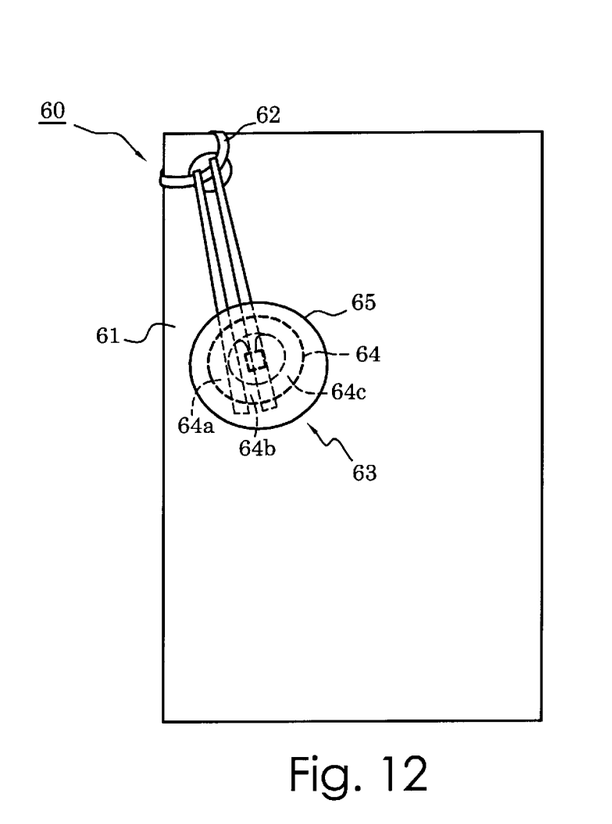
FIG. 12 shows a top plan view of the sealing device according to the invention used as an official seal on a ribboned official document.

FIG. 12 shows a top plan view of an official document, such as a letters patent, to which a sealed ribbon is attached. Previously, to form the ribboned official document, a hole was placed in one corner of each of the pages forming the document and a ribbon was passed through the hole. The ends of the ribbon were then sealed, either by attaching both ends of the ribbon to a top page of the official document or by placing the ends of the ribbon in some type of physical encapsulation, such as a disk of wax bearing an official seal. Likewise, the ends of the ribbon could be attached to the top sheet by a disk of wax bearing the official seal.

Figure 13:
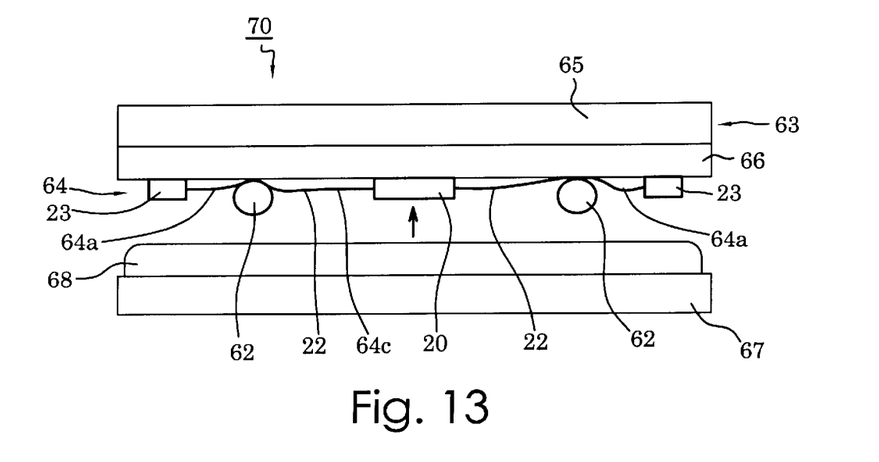
FIG. 13 is a second preferred embodiment of the sealing device shown in FIG. 12.

As shown in FIGS. 12 and 13, a safety strip 63 of this invention can be used in place of the wax disk or embossed adhesive label previously used. In particular, as shown in FIG. 12, an official document 60 contains a number of pages 61 to be sealed and a ribbon 62 passing through the pages 61 to be sealed and which is attached to the document 60 using a safety strip 63. When a support member 65 of the safety strip 63 is placed over the ribbon 62, a first portion 64a of a safety circuit 64 is positioned to one side of the ribbon 62, a second portion 64b is placed between the ends of the ribbon 62 and a third portion 64c is placed on another side of the ribbon from the first portion 64a. The safety strip 63 not only supports the safety circuit 64 but also carries some indicia, such as being embossed, signifying the official document as a sealed official document. The safety strip 63 insures that the official document 60 cannot be tampered with without destroying the safety circuit 64.

FIG. 13 shows a second embodiment of a safety strip 70 which can be attached to the ribbon 62. In particular, the safety strip 70 includes a support 65 and the safety circuit 64 and is attached to the ribbon 62 by an adhesive layer 66 as described above. Furthermore, the safety strip 70 includes a second support 67 and a second adhesive layer 68 which is placed on the ribbon 62 opposing the support 65. The supports 65 and 67 are firmly pressed together against the ribbon 62 in the safety circuit 64 such that any attempt to separate the supports 65 and 67 or to withdraw the ribbon 62 from between the supports 65 and 67 results in the safety circuit 64 breaking. This allows the ribbon 62 to be sealed without physically attaching the ribbon 62 to one of the pages 61 of the official document 60.

While this invention hats been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A safety sealing or marking device attachable to at least one of itself and a receiving article and comprising:
   a flexible support member;
   at least one adhesive film disposed on one side of the support member; and
   an electronic circuit disposed on the one side of the support member, the electronic circuit being remotely interrogatable and comprising:
   at least one electronic component, and
   a conductive path forming a coil and electrically connected to the at least one electronic component to form a closed circuit;
   wherein, when the safety sealing or marking device is attached to at least one of itself and the receiving article by the at least one adhesive film, an adhesion between the at least one adhesive film and the electronic circuit or an adhesion between the at least one of the safety sealing or marking device and the receiving article is such that an attempt to tramper with at least a part of the safety sealing or marking device causes a break in the electronic circuit, the break in the electronic circuit preventing the electronic circuit from responding to a remote interrogation.

2. A safety marking device attachable to a receiving article and comprising:
   a flexible support member;
   at least one adhesive film disposed on one side of the support member; and
   an electronic circuit disposed on the one side of the support member, the electronic circuit being remotely interrogatable and comprising:
   at least one electronic component, and
   a conductive path forming a coil and electrically connected to the at least one electronic component to form a closed circuit;
   wherein, when the safety marking device is attached to the receiving article by the at least one adhesive film, an adhesion between the at least one adhesive film, the electronic circuit and the receiving article is such that tampering with at least a part of the safety marking device causes a break in the electronic circuit, the break in the electronic circuit preventing the electronic circuit from responding to a remote interrogation.

3. The safety marking device of claim 2, wherein at least a portion of the support member is formed from at least one of paper, plastic and fabrics.

4. The safety marking device of claim 2, wherein the conductive path is formed by at least one conductive is wire.

5. The safety marking device of claim 2, wherein the electronic circuit is provided over only a portion of the support.

6. The safety marking device of claim 2, wherein the electronic circuit is attached to the support by the at least one adhesive film.

7. The safety marking device of claim 6, further comprising a second adhesive film provided over the electronic circuit.

8. The safety marking device of claim 2, wherein at least a portion of the electronic circuit is protected on at least one face by a protection film.

9. The safety marking device of claim 8, wherein the protection film is formed from one of varnish and plastic.

10. The safety marking device of claim 8, wherein a mechanical strength of the protection film is insufficient to prevent the electronic circuit from breaking due to tampering.

11. The safety marking device of claim 2, wherein the electronic circuit is a transponder.

12. The safety marking device of claim 2, wherein:

the at least one adhesive film comprises a first adhesive film having a first adhesive strength and a second adhesive film having a second adhesive strength greater than the first adhesive strength, a first portion of the electronic circuit and the first adhesive film positioned on a first portion of the support member and a second portion of the electronic circuit and the second adhesive film positioned on a second portion of the support member, and detaching the safety marking device from the receiving article causes at least portions of one of a) the first adhesive film and the first portion of the electronic circuit, and b) the second adhesive film and the second portion of the electronic circuit to detach from the receiving article to break the electronic circuit.

13. The safety marking device of claim 2, wherein tampering with at least a part of the safety marking device includes attempting to detach the safety marking device from the receiving article.

14. The safety marking device of claim 2, wherein the adhesion between the support member, the at least one adhesive film, the electronic circuit and the receiving article is such that tampering with at least a part of the safety marking device causes a break in the electronic circuit.

15. The safety marking device of claim 2, further comprising a detaching structure for detaching at least a portion of the safety marking device from the receiving article to break the electronic circuit.

16. The safety marking device of claim 15, wherein the detaching structure comprises a detaching portion of the support member which is folded under and adhesively attached by the adhesive layer to another portion of the support member before the support member is attached to the receiving article, the detaching portion remaining unattached to the receiving article.

17. The safety marking device of claim 2, further comprising:

a second support member; and at least one second adhesive layer disposed on one side of the second support member;

wherein the at least one second adhesive layer is attached to the at least one adhesive layer, the receiving article adapted to be positioned between the at least one second adhesive layer and the adhesive layer.

18. A safety marking device attachable to itself for encircling a portion of a marked article and comprising:

a flexible support member;

at least one adhesive film disposed on at least a portion of one side of the support member; and an electronic circuit disposed on the one side of the support member, the electronic circuit being remotely interrogatable and comprising:

at least one electronic component, and a conductive path forming a coil and electrically connected to the at least one electronic component to form a closed circuit;

wherein, when the safety marking device is adapted to be attached to itself about the portion of the marked article by the at least one adhesive film, an adhesion between the at least one adhesive film and the electronic circuit is such that tampering with at least a part of the safety marking device causes a break in the electronic circuit, the break in the electronic circuit preventing the electronic circuit from responding to a remote interrogation.

19. The safety marking device of claim 18, wherein at least a portion of at least the support member is formed from at least one of paper, plastic and fabric.

20. The safety marking device of claim 18, wherein the conductive path is formed by at least one conductive wire.

21. The safety marking device of claim 18, wherein the electronic circuit is provided over only a portion of the support.

22. The safety marking device of claim 18, wherein:

the at least one adhesive film is disposed over only the portion of the support member, the portion of the support member comprising the portion of the support member on which the conductive path is disposed; and the safety marking device is adapted to be placed around the portion of the marked article and a second portion of the support member is placed in contact with the at least one adhesive film to seal the safety marking device around is the marked article.

23. The safety marking device of claim 18, wherein the at least one adhesive film is disposed over the entire one surface of the support member, the safety marking device is adapted to be placed around the portion of the marked article and the at least one adhesive film is placed in contact with itself over at least a portion of the support member on which the conductive path is disposed to seal the safety marking device around the marked article.

24. The safety marking device of claim 18, wherein the at least one adhesive film is disposed over only a portion of the support member, the safety marking device is adapted to be placed around the portion of the marked article and a second portion of the support member is placed in contact with the at least one adhesive film to seal the safety marking device around the marked article.

25. The safety marking device of claim 18, wherein the electronic circuit is attached to the support by the at least one adhesive film.

26. The safety marking device of claim 25, further comprising a second adhesive film provided over the electronic circuit.

27. The safety marking device of claim 18, wherein at least a portion of the electronic circuit is protected on at least one face by a protection film.

28. The safety marking device of claim 27, wherein the protection film is formed from one of varnish and plastic.

29. The safety marking device of claim 27, wherein a mechanical strength of the protection film is insufficient to prevent the electronic circuit from breaking due to tampering.

30. The safety marking device of claim 18, wherein the electronic circuit is a transponder.

31. The safety marking device of claim 18, wherein the at least one adhesive film comprises a first adhesive film having a first adhesive strength and a second adhesive film having a second adhesive strength greater than the first adhesive strength, a first portion of the electronic circuit and the first adhesive film positioned on a first portion of the support member and a second portion of the electronic circuit and the second adhesive film positioned on a second portion of the support member, and tampering with at least a part of the safety marking device causes the electronic circuit to break.

32. The safety marking device of claim 18, wherein tampering with at least a part of the safety marking device includes attempting to detach the safety marking device from itself.

33. The safety marking device of claim 18, wherein the adhesion between the at least one adhesive film, the electronic circuit and the support member is such that tampering with at least a part of the safety marking device causes a break in the electronic circuit.

34. The safety marking device of claim 18, further comprising a detaching stricture for detaching at least a portion of the safety marking device from around the receiving article to break the electronic circuit.

35. The safety marking device of claim 18, further comprising:
  a second support member; and
  at least one second adhesive layer disposed on one side of the second support member;
  wherein the at least cone second adhesive layer is attached to the at least one adhesive layer, the marked article is adapted to be positioned between the at least one second adhesive layer and the adhesive layer.

36. A safety sealing device attachable to at least two relatively movable portions of a receiving article and comprising:
  a flexible support member;
  at least one adhesive film disposed on at least a portion of one side of the support member; and
  an electronic circuit disposed on the one side of the support member, the electronic circuit being remotely interrogatable and comprising:
    at least one electronic component, and
    a conductive path forming a coil and electrically connected to the at least one electronic component to form a closed circuit;
  wherein, when the safety sealing device is attached to the receiving article by the adhesive film, an adhesion between the adhesive film, the electronic circuit and the receiving article is such that tampering with at least a part of the safety sealing device causes a break in the electronic circuit, the break in the electronic circuit preventing the electronic circuit from responding to a remote interrogation.

37. The safety sealing device of claim 36, wherein at least a portion of the support member is formed from at least one of paper, plastic and fabric.

38. The safety sealing device of claim 36, wherein the conductive path is formed by at least one conductive wire.

39. The safety sealing device of claim 36, wherein the electronic circuit is provided over only a portion of the support.

40. The safety sealing device of claim 36, wherein the at least one adhesive film is disposed over only a portion of the support member, the portion comprising at least a portion of the support member on which at least a portion of the electronic circuit is disposed, the portion of the support member is attachable to the at least two portions of the receiving article to seal the receiving article.

41. The safety sealing device of claim 36, wherein the at least one adhesive film is disposed over the entire one surface of the support member and substantially the entire one surface of the support member is attachable to the at least two portions of the receiving article to seal the receiving article.

42. The safety sealing device of claim 36, wherein the electronic circuit is attached to the support member by the at least one adhesive film.

43. The safety sealing device of claim 42, further comprising a second adhesive film provided over the electronic circuit.

44. The safety sealing device of claim 36, wherein at least a portion of the electronic circuit is protected on at least one face by a protection film.

45. The safety sealing device of claim 44, wherein the protection film is formed from one of varnish and plastic.

46. The safety sealing device of claim 44, wherein a mechanical strength of the protection film is insufficient to prevent the electronic circuit from breaking due to tampering.

47. The safety sealing device of claim 36, wherein the at least two portions of the receiving article comprise a first part and a second part movable relatively to the first part, wherein at least a first portion of the adhesive film carrying a first portion of the electronic circuit is attachable to the first part of the receiving article and a second portion of the adhesive film carrying a second portion of the electronic circuit is attachable to the second part of the receiving article.

48. The safety sealing device of claim 36, wherein the electronic circuit is a transponder.

49. The safety sealing device of claim 36, wherein the at least one adhesive film comprises a first adhesive film having a first adhesive strength and a second adhesive film having a second adhesive strength greater than the first adhesive strength, a first portion of the electronic circuit and the first adhesive film positioned on a first portion of the support member and a second portion of the electronic circuit and the second adhesive film positioned on a second portion of the support member, and wherein tampering with at least a part of the safety sealing device causes at least portions of one of a) the first adhesive film and the first portion of the electronic circuit, and b) the second adhesive film and the second portion of the electronic circuit to detach from the at least two portions of the receiving article to break the electronic circuit.

50. The safety sealing device of claim 36, wherein tampering with at least a part of the safety sealing device includes attempting to detach the safety sealing device from at least one of the at least two portions of the receiving article.

51. The safety sealing device of claim 36, wherein the adhesion strength between the support member, the at least one adhesive film, the electronic circuit and the receiving article to which the device is adapted to be attached to is such that tampering with at least a part of the safety sealing device causes a break in the electronic circuit.

52. The safety sealing device of claim 36, further comprising a detaching structure for detaching at least a portion of the safety sealing device from the receiving article to break the electronic circuit.

53. The safety sealing devise of claim 52, wherein the detaching structure comprises a detaching portion of the support member which is folded under and adhesively attached by the adhesive layer to another portion of the support member before the support member is attached to the receiving article, the detaching portion remaining unattached to the receiving article.

54. The safety sealing device of claim 36, further comprising:
- a second support member; and
- at least one second adhesive layer disposed on one side of the second support member;
- wherein the at least one second adhesive layer is attached to the at least one adhesive layer, the receiving article is adapted to be positioned between the at least one second adhesive layer and the adhesive layer.

55. A safety sealing device attachable to itself about at least relatively movable two portions of a receiving article and comprising:
- a flexible support member;
- at least one adhesive film disposed on at least a portion of one side of the support member; and
- an electronic circuit disposed on the one side of the support member, the electronic circuit being remotely interrogatable and comprising:
  - at least one electronic component, and
  - a conductive path forming a coil and electrically connected to the at least one electronic component to form a closed circuit;
- wherein, when the safety sealing device is attached to itself about the receiving article by the adhesive film, an adhesion between the adhesive film and the electronic circuit is such that tampering with at least a part of the safety sealing device causes a break in the electronic circuit, the break in the electronic circuit preventing the electronic circuit from responding to a remote interrogation.

56. The safety sealing device of claim 55, wherein at least a portion of the support member is formed from at least one of paper, plastic and fabric.

57. The safety sealing device of claim 55, wherein the conductive path is formed by at least one conductive wire.

58. The safety sealing device of claim 55, wherein the electronic circuit is provided over only a portion of the support.

59. The safety sealing device of claim 55, wherein the at least one adhesive film is disposed over only a first portion of the support member, the first portion comprising at least a portion of the support member on which at least a portion of the electronic circuit is disposed, the at least one adhesive film attachable to a second portion of the support member about the at least two portions of the receiving article to seal the receiving article.

60. The safety sealing device of claim 55, wherein the at least one adhesive film is disposed over the entire one surface of the support member, the at least one adhesive film attachable to itself about the at least two portions of the receiving article to seal the receiving article.

61. The safety sealing device of claim 55, wherein the electronic circuit is attached to the support by the at least one adhesive film.

62. The safety sealing device of claim 61, further comprising a second adhesive film provided over the electronic circuit.

63. The safety sealing device of claim 55, wherein at least a portion of the electronic circuit is protected on at least one face by a protection film.

64. The safety sealing device of claim 63, wherein the protection film is formed from one of varnish and plastic.

65. The safety sealing device of claim 63, wherein a mechanical strength of the protection film is insufficient to prevent the electronic circuit from breaking due to tampering.

66. The safety sealing device of claim 55, wherein the electronic circuit is a transponder.

67. The safety sealing device of claim 55, wherein the at least one adhesive film comprises a first adhesive film having a first adhesive strength and a second adhesive film having a second adhesive strength greater than the first adhesive strength, a first portion of the electronic circuit and the first adhesive film positioned on a first portion of the support member and a second portion of the electronic circuit and the second adhesive film positioned on a second portion of the support member, and wherein tampering with at least a part of the safety sealing device causes the electronic circuit to break.

68. The safety sealing device of claim 55, wherein tampering with at least a part of the safety sealing device includes attempting to remove the safety sealing device when it is attached around the at least two portions of the receiving article.

69. The safety sealing device of claim 55, wherein the adhesion strength between the at least one adhesive film, the electronic circuit, the receiving article to which the device is adapted to be attached to and the support member is such that tampering with at least a part of the safety sealing device causes a break in the electronic circuit.

70. The safety sealing device of claim 55, further comprising a detaching structure for detaching at least a portion of the safety sealing device from the receiving article to break the electronic circuit.

71. The safety sealing device of claim 55, further comprising:
- a second support member; and
- at least one second adhesive layer disposed on one side of the second support member;
- wherein the at least one second adhesive layer is attached to the at least one adhesive layer, the receiving article is adapted to be positioned between the at least one second adhesive layer and the adhesive layer.

* * * * *